April 6, 1948.    C. E. G. BAILEY    2,438,987
RADIO NAVIGATIONAL AID
Filed Sept. 13, 1945

CHRISTOPHER E.G. BAILEY
INVENTOR

BY
*E. F. Wonderoth*
ATTORNEY

Patented Apr. 6, 1948

2,438,987

UNITED STATES PATENT OFFICE 2,438,987

RADIO NAVIGATIONAL AID

Christopher Edmund Gervase Bailey, Bournemouth, Hants, England, assignor to Radio Transmission Equipment Limited, London, England, a company of Great Britain Application September 13, 1945, Serial No. 615,945
In Great Britain May 23, 1944

Section 1, Public Law 690, August 8, 1946
Patent expires May 23, 1964

8 Claims. (Cl. 343—107)

To enable the pilot of a freely-moving vehicle, such as an aircraft, to determine his position in terms of the distance and bearing of the aircraft from a fixed point in a fixed line, systems have been proposed whereby a first series of pulses of radio waves radiated from a transmitter carried in the aircraft are received, amplified, and detected by a receiver situated near the fixed point (the ground receiver), which receiver causes a second synchronous series of pulses to be radiated from a transmitter at the fixed point (the ground transmitter), which second series of pulses are picked up by a receiver in the aircraft. The time interval between the origin of one of the first set of pulses and the reception of the corresponding member of the second set is proportional to the distance of the aircraft from the ground transmitter; and it has been proposed to measure this time interval by the distance from origin to pulse deflection on the time-base of a cathode-ray oscilloscope. It has further been proposed to determine the bearing of the aircraft by the use of two differently directive aerial systems, each of which radiates alternately a second set of pulses, as described heretofore; the pulses radiated from one set of aerials having durations different from those of the pulses from the other set of aerials. By examination of the pattern presented by the overlapping indications produced by such pulses on the oscilloscope, a pilot may determine his approximate bearing from the fixed point, and in particular may discover when this coincides with a pre-arranged bearing, the "course," along which both sets of aerials radiate with equal strength. It has further been proposed to combine such arrangements with a system for determining the orientation of the fixed point with respect to the fore-and-aft axis of the aircraft by equipping the said aircraft with two differently-directive receiving aerial systems, which are used alternately, the signals picked up by either set being distinguished by reversing the direction of deflection of the amplitude-axis of the oscilloscope beam.

Such systems as previously proposed are subject to disadvantages. For example, the alternate switching of the ground aerial systems requires an electro-mechanical switching system which must be in continual operation and is liable to wear. To minimise such wear, the switching frequency should be kept as low as possible; but if made too low it will cause the pattern on the oscilloscope to flicker. Permissible switching frequencies thus lie in a narrow range. But the switching frequency of the aircraft aerials also lies in this range, and if the two switching frequencies are nearly equal a "stroboscopic flicker" will appear in the pattern. Such flickers and "stroboscopic flickers" if permitted would cause fatigue to the pilot, and hence the ground switching frequency is raised, with corresponding increase of mechanical wear.

Again, if the leading edges of the long and short pulse traces on the oscilloscope are dissimilar due to accidental distortion, it is difficult to determine when the pulse amplitudes are equal.

Again, the systems previously proposed do not lend themselves readily to automatic correction of shifts in the course produced by accidental means.

The present invention comprises a ground system forming part of a radio navigational aid, in which these defects are eliminated. It further comprises a ground transmitter of relatively simple construction containing no electro-mechanical moving parts.

According to the present invention, in a system for radio navigational aid, a receiver adapted to receive a first set of radio pulses operates a transmitter which energises with a second set of radio pulses a radiator system adapted to give two or more differently directed radiations, at least one of said radiations comprising pulses, the duration of which is less than the duration of the pulses comprised in the remaining radiation or radiations and is contained within the latter duration. The radiator system may comprise two or more differently directive aerial systems of which at least one radiates pulses the duration of which is less than the duration of the pulses radiated by the remaining system or systems and is contained within the latter duration. Alternatively a single radiator may be excited in different modes instead of using separate aerial systems.

In a preferred form of the invention, a receiver adapted to receive a first set of pulses operates a transmitter which energises with a second synchronous set of pulses a first transmitter aerial system having a directional maximum in a predetermined plane and a second transmitter aerial system having a directional null in the said plane and a reversal of directional phase in either side of the said null, the duration of each pulse from the second set of aerials being less than the duration of each pulse from the first set and contained within it.

In order that the nature of the invention may be more readily understood, reference will now be had to the accompanying drawing, in which Fig. 1 shows in block-schematic form a radio-navigational aid according to the invention.

Fig. 2 shows the field patterns produced by the two differently directive aerial systems.

Fig. 3 indicates the nature of the patterns seen on the oscillograph by the pilot.

Figure 1:
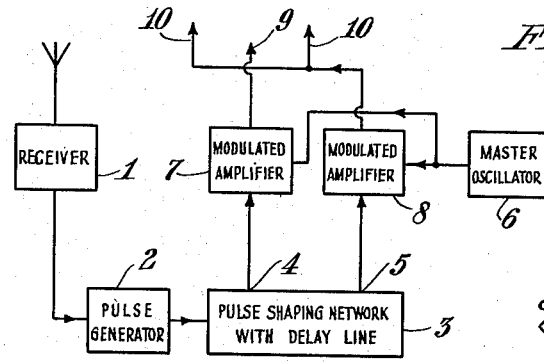

The output from the receiver 1, Fig. 1, triggers a pulse generator 2 producing pulses with a rapid rise and slow decay, which is connected to a pulse shaper 3 from which emerge two pulses, a long and a short: the long pulse starts before and finishes after the short pulse. This pulse shaper consists of a length of artificial line, one end of which is connected to the pulse generator while the other, remote end is short-circuited. The long pulse output is taken from the line at a point 4 close to the generator, while the short-pulse output is taken from a point 5 nearer the remote end. The incident pulse arrives first at the long-pulse output, then at the short-pulse output. Subsequently it is reflected, and the reflected pulse approximately annuls first the short-pulse output and then the long-pulse output.

Figure 4:
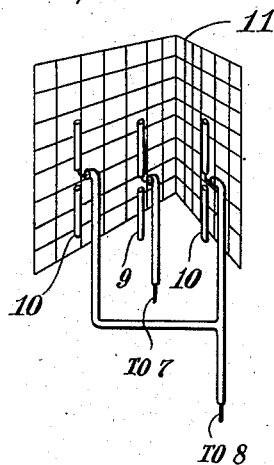
Fig. 4 illustrates a form of antenna system by means of which the field pattern illustrated in Fig. 2 may be produced.

The radio-frequency component of the transmitter output is generated by a master-oscillator 6, which drives two modulated power amplifiers 7, 8. The "inner" modulated amplifier 7 is keyed by the long pulses from the pulse shaper 3 and feeds an "inner" dipole 9 placed centrally in a corner reflector. The "outer" modulated amplifier 8 is keyed by the short pulses, and feeds a pair of "outer" dipoles 10 in opposite phases equally spaced about the inner dipole 9 in the plane through it at right angles to the plane bisecting the corner reflector. Fig. 4 illustrates a practical embodiment of such an antenna system having a screen-type reflector 11.

Figure 2:
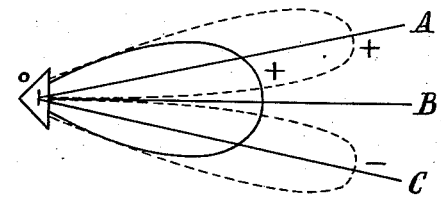

The field patterns produced by inner and outer aerial systems are shown in Fig. 2, an arbitrary instant of time being taken to illustrate the relative phases. The pattern of the inner aerial is shown by a full line and has a maximum along the pre-determined axis of symmetry or "course line" OB, while that of the outer aerials is shown by a broken line and has a minimum along OB and exhibits a phase reversal about it. It is clear that within the duration of the short pulse an aircraft on the line OA receives an increase of signal due to the addition of the two patterns, an aircraft on the line OC receives a decrease of signal, and on the line OB neither an increase nor a decrease.

The patterns seen on an airborne oscillograph having a vertical time base and periodic reversal of the horizontal deflection are illustrated in Figs. 3a, b, and c, which three figures refer to reception on the lines OA, OB, and OC, respectively. The bearing of the aircraft with reference to the line OB can be approximately determined from these patterns; and in particular, the shape of Fig. 3b indicates when this bearing is zero.

Figure 3:
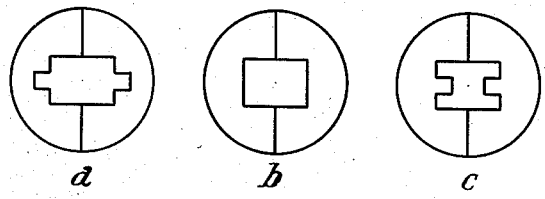

A study of Fig. 3 shows clearly that no confusion will arise from a slight distortion in the shape of the leading edges of the pulses.

In carrying into effect the described embodiment of this invention, it is important that the inner aerial output should not vary appreciably when the outer aerials radiate, for such variations would give a misleading indication to an aircraft on the course line. Thus, referring to Fig. 1, the master oscillator 6 should possess sufficiently good regulation to ensure that the drive to the inner modulated amplifier 7 does not decrease when the outer modulated amplifier 8 is in operation. It may be useful to interpolate "buffer stages" according to known technique between the master oscillator 6 and either or both modulated amplifiers 7 and 8.

If the inner aerial output shows such variation not of an extreme nature, the variation may be reduced by the following means. A monitor receiver on the course line receives, amplifies, and detects the total signal on the course line, and the output of this receiver is fed back to the inner modulated amplifier 7 to control its output. This receiver must be placed sufficiently close to the aerial system and connected to the inner modulated amplifier 7 by cables sufficiently short for the time-delay in the above process to be short, compared with the duration of the short pulse. It will be recognised by those familiar with the art that such an arrangement, comprising an appropriate sense of feedback, forms a negative-feedback chain, and accidental variations in the inner aerial output will be substantially reduced thereby. This arrangement also serves to compensate automatically variations in the signal on the course line arising from other causes than variations in drive to the inner modulated amplifier 7.

In a specific form of this invention, the transmitter is made to operate at about 220 mc./s., the long pulse lasts for 6 microseconds, and the short pulse starts 2 microseconds after the long pulse and lasts for 2 microseconds. The aerials are arranged in a corner reflector with 272 cm. sides and 136 cm. height; the inner aerial is spaced 68 cm. from the corner and the outer aerials 34 cm. on either side of it.

Figure 5:
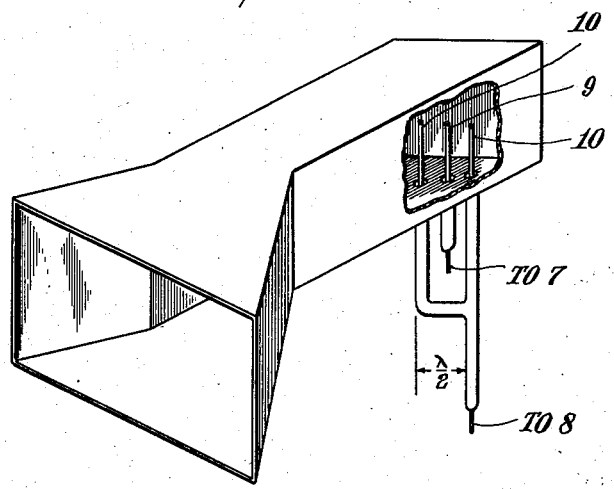
Fig. 5 illustrates another antenna system by means of which the field pattern illustrated in Fig. 2 may be produced.

Instead of using differently directive aerial systems (9 and 10, Fig. 1), equivalent results can be obtained by exciting a single radiator in different modes. For example, an electromagnetic sectoral horn radiator as shown in Fig. 5 may be employed, in which case the field pattern shown by the full line in Fig. 2 is radiated by causing a wave of $TE_{10}$ mode to pass down the throat of the horn, while the field pattern shown by the broken line in Fig. 2 is radiated by causing a wave of $TE_{20}$ mode to pass down the same horn. The respective modes may be generated in known manner by suitable configuration of conductors connected to modulated amplifier 7 and modulated amplifier 8 respectively (Fig. 1).

I claim:

1. In a system for radio-navigation, a receiver for a wave modulated by a first set of pulses, means coupled to said receiver to generate a second set of pulses and a third set of pulses, the pulses of said third set occurring during the duration of the pulses of said second set and having a duration less than the duration of the pulses of said second set, means to generate a radio frequency radiation field in a given direction, means to generate a radio frequency radiation field in another direction, means to modulate said first field at a rate and for a duration proportional to said pulses of said second set, and means to modulate said second field at a rate and for a duration proportional to said pulses of said third set.

2. In a system for radio-navigation, a receiver for a wave modulated by a first set of pulses, means coupled to said receiver to generate a second set of pulses and a third set of pulses, the pulses of said third set occurring during the duration of the pulses of said second set and having a duration less than the duration of the pulses of said second set, means to generate a radio frequency wave modulated proportional to the amplitude variations of the pulses of said second set, means to generate a radio frequency wave modulated proportional to the amplitude variations of the pulses of said third set, and means to radiate said modulated radio frequency waves in different azimuthal directions with overlapping radiation patterns.

3. In a system for radio-navigation, a receiver for a wave modulated by a first set of pulses, means coupled to said receiver to generate a second set of pulses and a third set of pulses, the pulses of said third set occurring during the duration of the pulses of said second set and having a duration less than the duration of the pulses of said second set, means to generate a radio frequency wave modulated proportional to the amplitude variations of the pulses of said second set, means to generate a second radio frequency wave modulated proportional to the amplitude variations of the pulses of said third set, and means comprising a plurality of differently directive antenna systems to radiate said modulated radio frequency waves in different azimuthal directions and with overlapping radiation patterns.

4. In a system for radio-navigation, a receiver for a wave modulated by a first set of pulses, means coupled to said receiver to generate a second set of pulses and a third set of pulses, the pulses of said third set occurring during the duration of the pulses of said second set and having a duration less than the duration of the pulses of said second set, means to generate a radio frequency wave modulated proportional to the amplitude variations of the pulses of said second set, means to generate a second radio frequency wave modulated proportional to the amplitude variations of the pulses of said third set, means comprising an antenna to radiate said first modulated radio frequency wave in a given azimuthal direction to provide maximum radiation in a vertical plane determined by said direction, and means to radiate said second modulated radio frequency wave comprising a second antenna having a null in said plane and a reversal of directional phase on either side of said null.

5. In a system for radio-navigation, a receiver for a wave modulated by a first set of pulses, means coupled to said receiver to generate a second set of pulses and a third set of pulses, the pulses of said third set occurring during the duration of the pulses of said second set and having a duration less than the duration of the pulses of said second set, means to generate a radio frequency wave modulated proportional to the amplitude variations of the pulses of said second set, means to generate a radio frequency wave modulated proportional to the amplitude variations of the pulses of said third set, and means to radiate said first generated modulated radio frequency wave in a given azimuthal direction to provide maximum radiation in a vertical plane determined by said direction and to radiate said second generated modulated radio frequency wave to provide a null in said plane and a reversal of directional phase on either side of said null, said means comprising an antenna system having a corner reflector, a dipole centrally located with respect to said reflector and energized by said first generated wave, and two dipoles equally spaced from and located on either side of said first dipole in a plane bisecting the central angle of said corner reflector and energized by said second modulated radio frequency wave.

6. In a system for radio-navigation, a receiver for a wave modulated by a first set of pulses, means coupled to said receiver to generate a second set of pulses and a third set of pulses, the pulses of said third set occurring during the duration of the pulses of said second set and having a duration less than the duration of the pulses of said second set, means to generate a radio frequency wave modulated proportional to the amplitude variations of the pulses of said second set, means to generate a radio frequency wave modulated proportional to the amplitude variations of the pulses of said third set, and means to radiate said first generated modulated radio frequency wave in a given azimuthal direction to provide maximum radiation in a vertical plane determined by said direction and to radiate said second generated modulated radio frequency wave to provide a null in said plane and a reversal of directional phase on either side of said null, said means comprising an electromagnetic radiator system excited in the $TE_{1,0}$ mode to radiate said first modulated radio frequency wave and excited in the $TE_{2,0}$ mode to radiate said second modulated radio frequency wave.

7. In a system for radio-navigation, a receiver for a wave modulated by a first set of pulses, a pulse generator coupled to said receiver to generate pulses proportional to said first set of pulses and having a rapid rise and slow decay, means to generate a second set of pulses and a third set of pulses, the pulses of said third set occurring during the duration of the pulses of said second set and having a duration less than the duration of the pulses of said second set, said means comprising a pulse-shaping network comprising a length of artificial transmission line having one end coupled to said pulse generator and the other end short circuited, means to generate a radio frequency wave modulated proportional to the amplitude variations of the pulses of said second set, means to generate a radio frequency wave modulated proportional to the amplitude variations of the pulses of said third set and means to radiate said modulated radio frequency waves in different azimuthal directions with overlapping radiation patterns.

8. In a system for radio-navigation, a receiver for a wave modulated by a first set of pulses, a pulse generator coupled to said receiver to generate pulses proportional to said first set of pulses and having a rapid rise and slow decay, a pulse-shaping network comprising a length of artificial transmission line having one end coupled to said pulse generator and the other end short-circuited, means to generate a second set of pulses and a third set of pulses, the pulses of said third set occurring during the duration of the pulses of said second set and having a duration less than the duration of the pulses of said second set, said means comprising a tapping at a portion near said first end of said transmission line and a second tapping spaced from said first end of said transmission line, means to generate a radio frequency wave modulated proportional to the amplitude variations of the pulses of said second set, means to generate a radio frequency wave modulated proportional to the amplitude variations of the pulses of said third set, and means to radiate said modulated radio frequency waves in differing azimuthal directions with overlapping radiation patterns.

CHRISTOPHER EDMUND GERVASE BAILEY.

REFERENCES CITED

The following references are of record in the file of this patent:

UNITED STATES PATENTS

| Number | Name | Date |
| --- | --- | --- |
| 2,132,599 | Baumann et al. | Oct. 11, 1938 |
| 2,255,042 | Barrow | Sept. 9, 1941 |
| 2,270,314 | Kraus | Jan. 20, 1942 |
| 2,321,698 | Nolde | June 15, 1943 |
| 2,400,736 | Brown | May 21, 1946 |
| 2,408,779 | Jenks | Oct. 8, 1946 |
| 2,412,996 | Levy et al. | Dec. 2, 1946 |

FOREIGN PATENTS

| Number | Country | Date |
| --- | --- | --- |
| 457,176 | Great Britain | Nov. 23, 1936 |